April 10, 1951 — C. R. HAYWARD ET AL — 2,547,939
EXTRACTION OF TIN FROM ORES AND CONCENTRATES
Filed Nov. 28, 1947

INVENTORS
CARLE R. HAYWARD
LIVINGSTON WRIGHT
BY Edgar W. Kent
ATTORNEY

Patented Apr. 10, 1951

2,547,939

UNITED STATES PATENT OFFICE 2,547,939

EXTRACTION OF TIN FROM ORES AND CONCENTRATES

Carle R. Hayward, Quincy, and Livingston Wright, Marshfield Hills, Mass., assignors to New Enterprises, Inc., Boston, Mass., a corporation of Massachusetts Application November 28, 1947, Serial No. 788,406

4 Claims. (Cl. 75—85)

The present invention relates to the extraction of tin from tin-bearing ore or concentrates containing iron, and more particularly to a process for the reduction of tin oxides contained in such ores or concentrates in a gaseous reducing medium.

In the past, tin has been extracted from tin ores, such as cassiterite in which it is present as tin oxide, by costly high-temperature smelting procedures in which considerable quantities of tin were lost by volatilization and slagging. Efforts have been made to recover tin from such ores by reduction of the ore by a gaseous medium, but no such proposed gaseous reduction process has achieved commercial recognition, largely because of the difficulty and expense of separating the tin from iron-tin alloys which form during the reduction.

It is an object of the invention to provide an efficient process for the gaseous reduction of the tin oxide in tin- and iron-bearing ores and concentrates which will leave the tin substantially uncontaminated by metallic iron, in which condition it can readily be separated and recovered as pure metallic tin.

A further object is to reduce the tin oxide to tin while inhibiting substantial reduction of ferric oxides present in such ores, or formed during the extraction treatment, to lower oxides than $Fe_3O_4$ or to iron.

Figure 1:
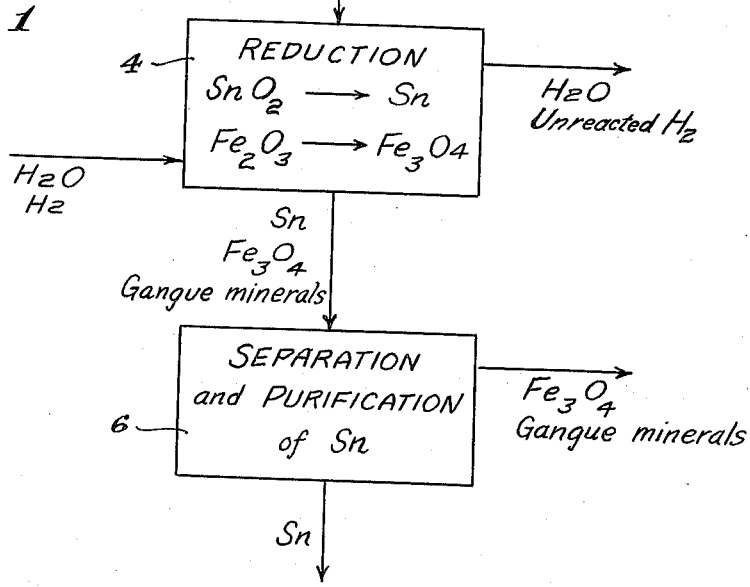
Figure 2:
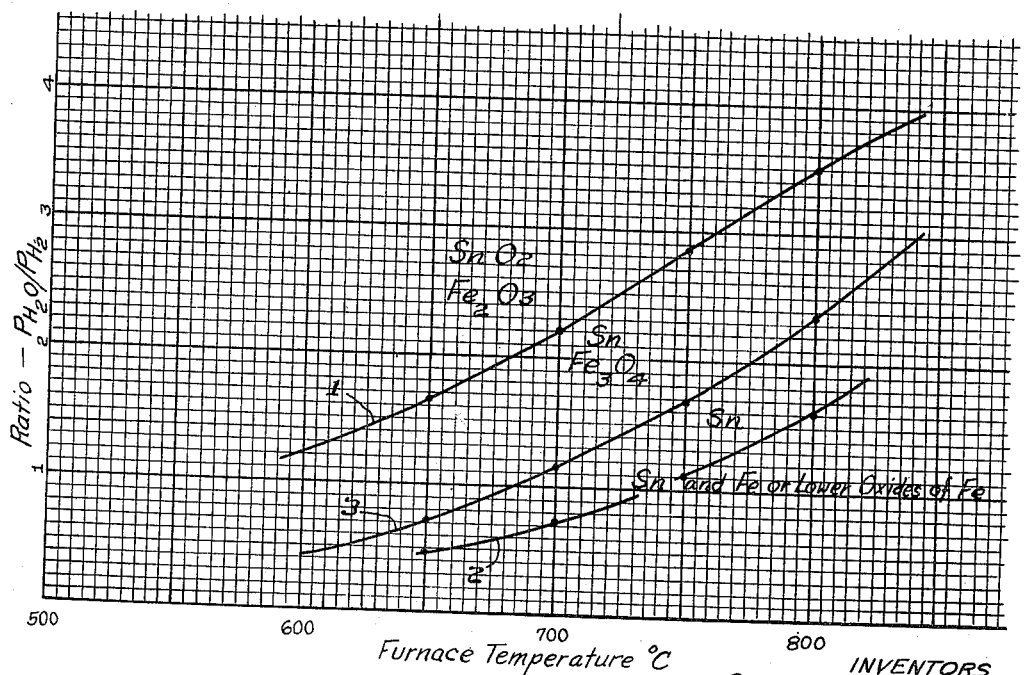

The process of the invention is illustrated in the acompanying drawings, wherein:

Fig. 1 is a flow sheet illustrating the reducing process of the present invention and its relationship to other steps in the extraction procedure; and Fig. 2 is a graph of certain temperature-pressure relationships characteristic of our process.

Our process is useful with any of the tin-bearing ores or concentrates, typified by cassiterite, but certain low-grade ores may with advantage first be concentrated. Such ores or concentrates may have a tin content as low as 10% and an iron content ranging from a fraction of a percent up to 25% or higher. The tin and iron are present mainly as oxides. Frequently, the ore also contains arsenic, sulphur, bismuth and lead, in smaller amounts.

Hereinafter and in the appended claims the term "ore" will for convenience be used to designate such ores and concentrates.

When these ores are reduced in an ordinary reducing atmosphere, such as an atmosphere of hydrogen or mixtures of hydrogen and other reducing gases, reduction of the iron oxides to iron takes place along with reduction of tin oxide to tin and under the conditions prevailing in the reduction zone, the iron and tin combine, forming an alloy from which it is difficult to recover the tin. The formation of such an alloy may well account for the failure of prior efforts to employ a gaseous reduction step in the extraction of tin from cassiterite or other tin bearing ores.

We have discovered that such ores can be reduced to produce tin in a recoverable condition without this troublesome difficulty by treatment of the ore in a gaseous reducing atmosphere containing hydrogen and water vapor within certain critical ratios.

We have found that at any given reducing temperature, the addition of a certain proportion of water vapor to the hydrogen will inhibit reduction of $Fe_3O_4$ without interfering with the reduction of $SnO_2$ to tin. The ratio of water vapor to hydrogen required to produce these results is a function of the temperature in the reducing zone.

Provided the temperature is kept below the fusion point of the ore, the reduction treatment of our invention reduces substantially all the tin oxide of the ore to tin which can readily be separated from the gangue.

The accompanying graph, Fig. 2, shows the range of ratios of water vapor to hydrogen which we have found to be effective in the manner above set forth at reduction temperatures within the range of effective operating temperatures below about 845° C. These ratios are in the range between 0.40 at 650° C. on curve 2 and 4.0 at 845° C. on curve 1.

In the graph of Fig. 2, curve 2 shows the minimum ratios of water vapor partial pressure to hydrogen partial pressure which at the various temperatures of the range covered, we have found to be effective in preventing reduction of the iron oxides present in the reduction mass to iron. Curve 1 similarly shows the maximum ratios of water vapor to hydrogen which we have found may be employed without interfering with reduction of $SnO_2$ to tin. At water vapor-hydrogen ratios below curve 2, excessive reduction of iron oxides takes place, and at ratios above curve 1, excessive oxidation of Sn to $SnO_2$ takes place, preventing effective and efficient treatment of the ore. The percentages of water vapor employed in our process lie between curves 1 and 2 and are effective, as previously stated, to prevent substantial reduction of ferric oxide to iron and consequent alloying of tin and iron without impeding the desired tin oxide reduction.

We have found that further improvement in the efficiency and effectiveness of the reduction treatment can be obtained if the ratio of water vapor to hydrogen is kept above the curve 3 of Fig. 2. Below this curve, excessive reduction of $Fe_3O_4$ to lower oxides or iron may occur. Above this curve, the iron oxide is maintained as $Fe_3O_4$ with substantially no reduction to a lower oxide, so that the amount of hydrogen consumed is very substantially reduced.

Referring to the flow sheet of the process, Fig. 1, the raw or roasted ore preferably is briquetted with or without a binder, or sintered or compacted by other means, and is then transferred to a reduction zone 4 in which it is heated at a temperature below its fusion or sintering point, which generally is below 800° C., at a temperature at which reduction of $SnO_2$ to tin will occur, generally above 650° C., in a gaseous reducing atmosphere containing hydrogen and an amount of water vapor sufficient, at the particular temperature, to inhibit reduction of $Fe_3O_4$ to iron but insufficient to prevent reduction of tin oxide to tin. The ratio of water vapor to hydrogen in the reducing zone is maintained between the points on curves 1 and 2 corresponding to the temperature, and preferably above curve 3.

The reducing medium may contain, in addition to hydrogen, another reducing gas or gases, or inert gases.

The proportion of water vapor to be included in the reducing medium depends upon the temperature to be employed in the reducing zone, which in turn depends upon the type and grade of ore to be treated, particularly upon the fusion point of the ore. When the temperature has been determined, the proportion of water vapor to be included in the gas supplied to the reducing zone will be apparent from curves 1, 2 and 3 and should be such that the ratio of water vapor to hydrogen in the reducing zone lies between curves 1 and 2 and preferably between curves 1 and 3.

The reduction treatment may be carried out by bringing the reducing gas into contact with the ore in any suitable manner. We prefer to use a shaft furnace through which the ore progresses countercurrent to the flow of the reducing gas. Thus a rapid reaction with a minimum of mechanical difficulties can be obtained.

The residue from the reduction step is next treated, as indicated at 6, to separate the tin therefrom. Such separation may be effected, for example, by flotation or gravity separation, by chloride volatilization treatment involving the formation of tin chloride, or by leaching the tin from the residue with either acid or alkali (such as sulphuric acid or sodium hydroxide), or by a combination of such methods. The leaching or chloride volatilization treatment is followed by suitable treatment, such as electrolysis or chemical precipitation, by which the tin is recovered. Thereafter, if necessary, the tin is further purified to remove contaminants, e. g., bismuth and lead, which, in the case of some ores, may be present in the reduced tin.

We claim:

1. A method for extracting tin from ore containing tin oxide and iron oxide which includes the steps of reducing tin oxide of the ore to tin that is substantially uncontaminated by metallic iron so as to obviate the necessity for any subsequent smelting step, said reducing step comprising heating the ore to a temperature above 650° C. and below about 845° C. in a reducing zone while supplying to said zone a gaseous reducing medium, said reducing medium containing hydrogen and an amount of water vapor such as to maintain in said zone at substantially all times during said reduction step a partial pressure of water vapor the ratio of which to the partial pressure of hydrogen in said zone at the temperature thereof lies between curves 1 and 2 of the graph of Fig. 2 of the annexed drawing, i. e., between 0.49 at 650° C. on curve 2 and 4.0 at 845° C. on curve 1, in which range of ratios said water vapor is effective to prevent substantial reduction of iron oxides present in the reduction mass to iron without substantially inhibiting the reduction of tin oxide of the ore to tin, and recovering tin from the reduction mass.

2. A method for extracting tin from ore containing tin oxide and iron oxide which includes the steps of reducing tin oxide of the ore to tin that is substantially uncontaminated by metallic iron so as to obviate the necessity for any subsequent smelting step, said reducing step comprising heating the ore to a temperature above 650° C. and below about 845° C. in a reducing zone while supplying to said zone a gaseous reducing medium, said reducing medium containing hydrogen and an amount of water vapor such as to maintain in said zone at substantially all times during said reduction step a partial pressure of water vapor the ratio of which to the partial pressure of hydrogen in said zone at the temperature thereof lies between curves 1 and 3 of the graph of Fig. 2 of the annexed drawing, i. e., between 0.70 at 650° C. on curve 3 and 4.0 at 845° C. on curve 1, in which range of ratios said water vapor is effective to prevent substantial reduction of $Fe_3O_4$ present in the reduction mass to lower oxides without substantially inhibiting the reduction of tin oxide of the ore to tin, and recovering tin from the reduction mass.

3. A method for extracting tin from ore containing tin oxide and iron oxide which includes the steps of reducing tin oxide of the ore to tin that is substantially uncontaminated by metallic iron so as to obviate the necessity for any subsequent smelting step, said reducing step comprising heating the ore to a temperature above 650° C. and below about 845° C. while continuously moving the ore through a reducing zone, during said reduction step continuously flowing through said zone in a direction countercurrent to the movement of the ore a gaseous reducing atmosphere containing hydrogen and water vapor in such relative amounts that, at substantially all times during the reduction step, the ratio of the partial pressure of the water vapor in said atmosphere to the partial pressure of the hydrogen in said atmosphere at the temperature thereof lies between curves 1 and 3 of the graph of Fig. 2 of the annexed drawing, i. e., between 0.70 to 650° C. on curve 3 and 4.0 at 845° C. on curve 1 in which range of ratios said water vapor is effective to prevent substantial reduction of $Fe_3O_4$ present in the reduction mass to lower oxides without substantially inhibiting the reduction of tin oxide of the ore to tin, and recovering tin from the reduction mass.

4. A method for extracting tin from ore containing tin oxide and iron oxide which includes the steps of reducing tin oxide of the ore to tin that is substantially uncontaminated by metallic iron so as to obviate the necessity for any subsequent smelting step, said reducing step comprising heating the ore to a temperature above 650° C. and below about 845° C. while continuously moving the ore through a reducing zone, during said reduction step continuously flowing through said zone in a direction countercurrent to the movement of the ore a gaseous reducing atmosphere containing hydrogen and water vapor in such relative amounts that, at substantially all times during the reduction step, the ratio of the partial pressure of the water vapor in said atmosphere to the partial pressure of the hydrogen in said atmosphere at the temperature thereof lies between curves 1 and 2 of the graph of Fig. 2 of the annexed drawing, i. e., between 0.49 at 650° C. on curve 2 and 4.0 at 845° C. on curve 1, in which range of ratios said water vapor is effective to prevent substantial reduction of iron oxides present in the reduction mass to iron without substantially inhibiting the reduction of tin oxide of the ore to tin, and recovering tin from the reduction mass.

CARLE R. HAYWARD.
LIVINGSTON WRIGHT.

REFERENCES CITED

The following references are of record in the file of this patent:

UNITED STATES PATENTS

| Number | Name | Date |
|---|---|---|
| 1,436,961 | Johnson | Nov. 28, 1922 |